United States Patent [19]

Suzuki et al.

[11] Patent Number: 4,706,245
[45] Date of Patent: Nov. 10, 1987

[54] NETWORK SYSTEM

[75] Inventors: Tadashi Suzuki, Yokohama; Minoru Tomikashi, Zushi; Toru Futami; Atsushi Sakagami, both of Yokosuka, all of Japan

[73] Assignee: Nissan Motor Company, Limited, Yokohama, Japan

[21] Appl. No.: 786,935

[22] Filed: Sep. 27, 1985

[30] Foreign Application Priority Data

Oct. 1, 1984 [JP] Japan .................. 59-206043

[51] Int. Cl.⁴ ................ H04J 3/02; H04J 3/06; H04L 7/06
[52] U.S. Cl. .................... 370/85; 370/100; 370/110.4; 375/113; 340/825.52
[58] Field of Search .............. 340/825.5, 825.52; 370/92, 85, 100, 9, 110.4; 375/107, 113

[56] References Cited

U.S. PATENT DOCUMENTS 4,525,832  6/1985  Miyad .................... 370/85
4,569,044  2/1986  Tao et al. ............... 370/85
4,596,025  6/1986  Satoh .................... 370/85

FOREIGN PATENT DOCUMENTS 52-13367  4/1977  Japan .

Primary Examiner—Douglas W. Olms
Assistant Examiner—Frank M. Scutch, III
Attorney, Agent, or Firm—Schwartz, Jeffery, Schwaab, Mack, Blumenthal & Evans

[57] ABSTRACT

A network system having a single-wire common signal transmission line to which a plurality of data processing stations and a synchronous code signal generator are connected. Each station constituting the network system comprises: first means for repeatedly generating an address information bit signal based on a predetermined time series code for each predetermined synchronization timing, modulating each address information bit signal into a synchronous signal having predetermined pulsewidths which is dependent on a bit status of each address information bit signal and outputting the modulated synchronous signal to the common signal transmission line so as to be superposed on the serial bit data string, second means provided within each station for receiving the synchronous signal on the signal transmission line derived from the first means and extracting the bit status information of the predetermined time series code from the received synchronous signal on the basis of the pulsewidth of the received synchronous signal from the common signal transmission line, third means for determining bit combination pattern of a predetermined bit length inherent in the predetermined time series code from the predetermined time series code comprising each of the bit status information extracted by the second means, and fourth means for determining an operation mode of the station from the bit combination pattern determined by the third means.

9 Claims, 10 Drawing Figures

NETWORK SYSTEM

BACKGROUND OF THE INVENTION

1. Field of the Invention

The present invention relates to a network system in which transmission and reception of a serial data are mutually carried out between a plurality of data stations on a common signal line and are synchronized with a synchronous signal generated for synchronizing the transmission and reception of the serial data therewith and sent on the same single-wire type common signal line.

2. Description of the Prior Art

Figure 1:
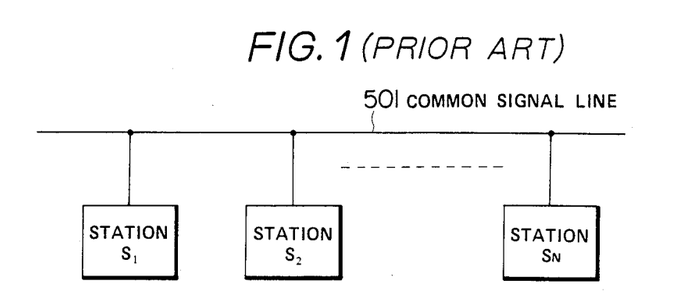
FIG. 1 is a simplified block diagram of a conventional network system.

FIG. 1 shows a conventional network system.

Figure 2:
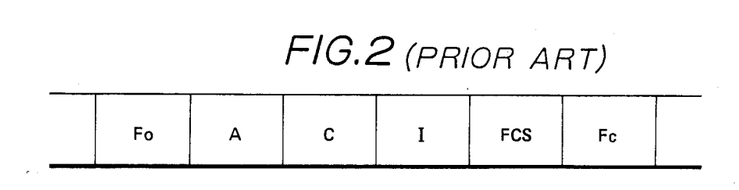
FIG. 2 is a format of an information signal used in the conventional network system shown in FIG. 1.

In FIG. 1, a single common signal line 501 is provided for connecting a plurality of stations $S_1, S_2, \ldots, S_N$. A format of a signal communicating with each station $S_1, S_2, S_N$ is a string (bit serial) as shown in FIG. 2. Such a signal format is called SDLC (Synchronous Data Link Communication) developed by IBM corporation. In this signal format shown in FIG. 2, [Fo] and [Fc] have a bit pattern of "01111110" indicating the start and end of the data string. In FIG. 2, [A] comprises normally eight serial bits and indicates a destination address to which a data to be transferred [I] is sent. In FIG. 2, [C] comprises normally eight serial bits and indicates a kind of the data [I]. In addition, [FCS] is provided for detecting an error in the data [I] generated during the transmission of the data [I].

In the SDLC format, however, the destination address [A] is indispensable for synchronization of data transmission and reception, and the data needs to be transferred in a single signal line 501 together with [Fo] and [Fc]. Therefore, there is a problem in that since more time is required for transmitting such information bits as [Fo], [Fc], and [A] in addition to the time for the data [I], transmission efficiency of data is accordingly reduced.

To cope with such a transmission efficiency problem, a two-wire type network system has been proposed in which data string signals and address signals are sent on their separately used signal lines. In this network system, a predetermined code string signal is sent to each station via an exclusive synchronous signal transmission line so that addressing (selection of two data stations mutually communicated) and synchronization are taken with the code string signal for each station. This is exemplified by Japanese Patent Examined Open No. Sho. 52-13,367 titled to a system for transmitting multiplex signals published on Apr. 14, 1977.

Figure 3:
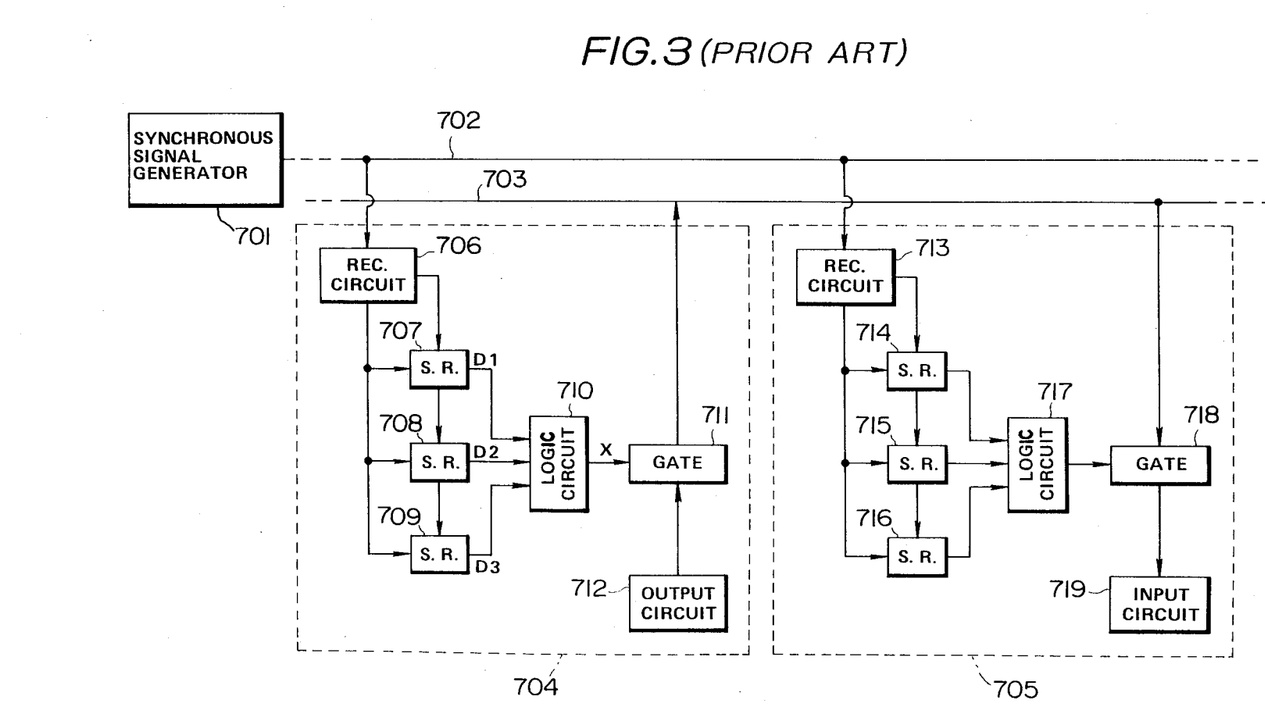
FIG. 3 is a simplified circuit block diagram of a conventional two-wire type network system disclosed in Japanese Patent Application Examined Open No. Sho. 52-13,367.

The disclosed network system shown in FIG. 3 comprises a plurality of pairs of transmission stations 704 and reception stations 705 which are mutually connected via the synchronous signal transmission line 702 and data transmission line 703. Such a synchronous signal as shown in (c) of FIG. 4 is sent to each station from a synchronous signal generator 701 via the synchronous signal line 702.

Figure 4:
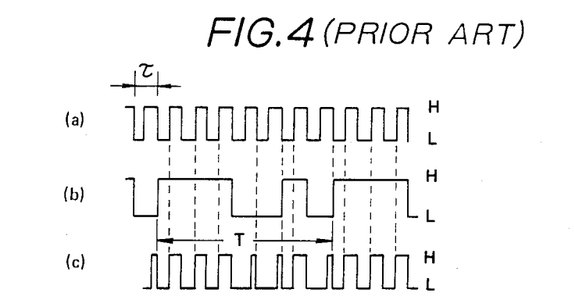
FIG. 4 is a timing chart for explaining an internal operation of a synchronous signal generator installed in the network system shown in FIG. 3.

In the synchronous signal generator 701, a clock signal having a constant period $\tau$ as shown in (a) of FIG. 4 and an M-series code repeating such an order as "H", "H", "H" "L", "L", "H", and "L" for a constant period T as shown in FIG. (b) of 4 are generated. The synchronous signal generator 701, furthermore, modulates the generated M-series code in a pulsewidth modulation manner so that the synchronous signal as shown in (c) of FIG. 4 is output to the synchronous signal line 702.

As shown in FIG. 3, the transmission station 704 comprises: (a) a receiving circuit 706 which receives and demodulates the synchronous signal into the clock signal and original series code signal as shown in (a) and (b) of FIG. 4; (b) three-stage shift registers 707, 708, and 709 which shift sequentially the demodulated code series signal in synchronization with the clock signal derived from the receiving circuit 706; (c) a logic circuit 710 which enables a gate 711 to open when a logic operation of each output signal level of the shift registers 707, 708, and 709 is carried out and a predetermined logic result is established.

Figure 5:
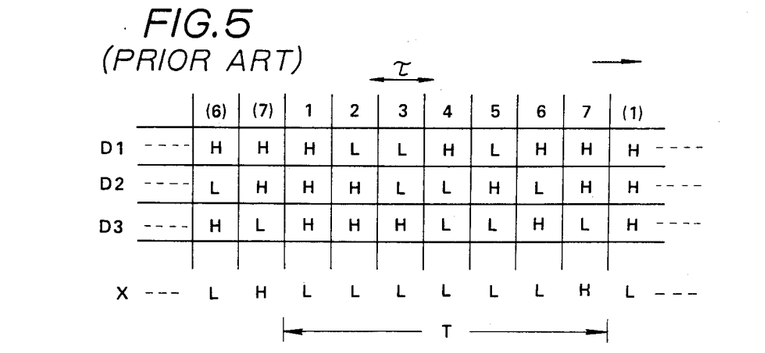
FIG. 5 is a logic state diagram for explaining logic status of an M-series synchronous code used in the network system shown in FIG. 3.

FIG. 5 shows a relationship between the outputs D1, D2, and D3 of the shift registers (S.R.) 707, 708, and 709 and output logic status X of the logic circuit 710 for each clock signal generation.

As shown in FIG. 5, a combination if seven separate patterns of "L" and "H" of the output signals of the shift registers 707, 708, and 709 appears, during a period T of the code series signal.

Hence, if one of the seven kinds of combination patterns in each transmission station 704 is a condition of establishment in the logic circuit 710 (for example, "H", "H", and "L" as shown in FIG. 5), the logic condition of the logic circuit 710 is established once for a period T of the code series signal so that the gate 711 is enabled to open. Consequently, one bit constituting the serial data is sent from an output circuit 712 to the data transmission line 703 during the period T.

On the other hand, the reception station 705 comprises the reception circuit 713, three-stage shift registers (S.R.) 714, 715, and 716 and logic circuit 717. The gate 718 is enabled to open only when the predetermined combination is established for one period T of the series code signal so that one bit constituting the serial data is fetched into a signal input circuit 719 from the data transmission line 703 via the gate 718.

In this way, any one of the transmission stations 704 can transmit data with any one of the reception stations 705 which has a logic circuit 717 having the same logic establishment condition as that of the logic circuit 710 via the line 703. In addition, the transmission station 704 can have a different synchronization with the other transmission/reception stations having other logic establishment conditions so that data transfer is made without collision of data.

However, since the synchronous signal line 702 and serial data signal line 703 are exclusively used in the disclosed two-wire type network system, the number of signal lines and the number of repeater and connectors usually increase so that the construction of the network system becomes complex, of large size, and requires large expenditure.

SUMMARY OF THE INVENTION

With the above-described problem in mind, it is an object of the present invention to provide a network system in which a construction of the whole network system is simplified and its manufacturing cost is reduced, with the transmission efficiency appropriately maintained. The above-described object can be achieved by providing a network system, comprising: (a) a single-wire common signal transmission line for transferring a serial bit data string between a plurality of data processing stations connected thereto, (b) first means for repeatedly generating an address information bit signal based on a predetermined time series code for each predetermined synchronization timing, modulating each address information bit signal into a synchronous signal having either of predetermined pulsewidths which is dependent on a bit status of each address information bit signal and outputting the modulated synchronous signal to the common signal transmission line so as to superpose on the serial bit data string, (c) second means provided within each station for receiving the synchronous signal on the signal transmission line derived from the first means and extracting the bit status information of the predetermined time series code from the received synchronous signal on the basis of the pulsewidth of the received synchronous signal from the common signal transmission line, (d) third means for determining bit combination pattern of a predetermined bit length inherent to the predetermined time series code from the predetermined time series code comprising each of the bit status information extracted by the second means, and (e) fourth means for determining an operation mode of the station from the bit combination pattern determined by the third means.

BRIEF DESCRIPTION OF THE DRAWINGS

A more complete understanding of the present invention may be obtained from the following description taken in conjunction with the attached drawings in which like reference numerals designate corresponding elements and in which.

DETAILED DESCRIPTION OF THE PREFERRED EMBODIMENT

Reference will hereinafter be made to the drawings in order to facilitate understanding of the present invention.

Figure 6A:
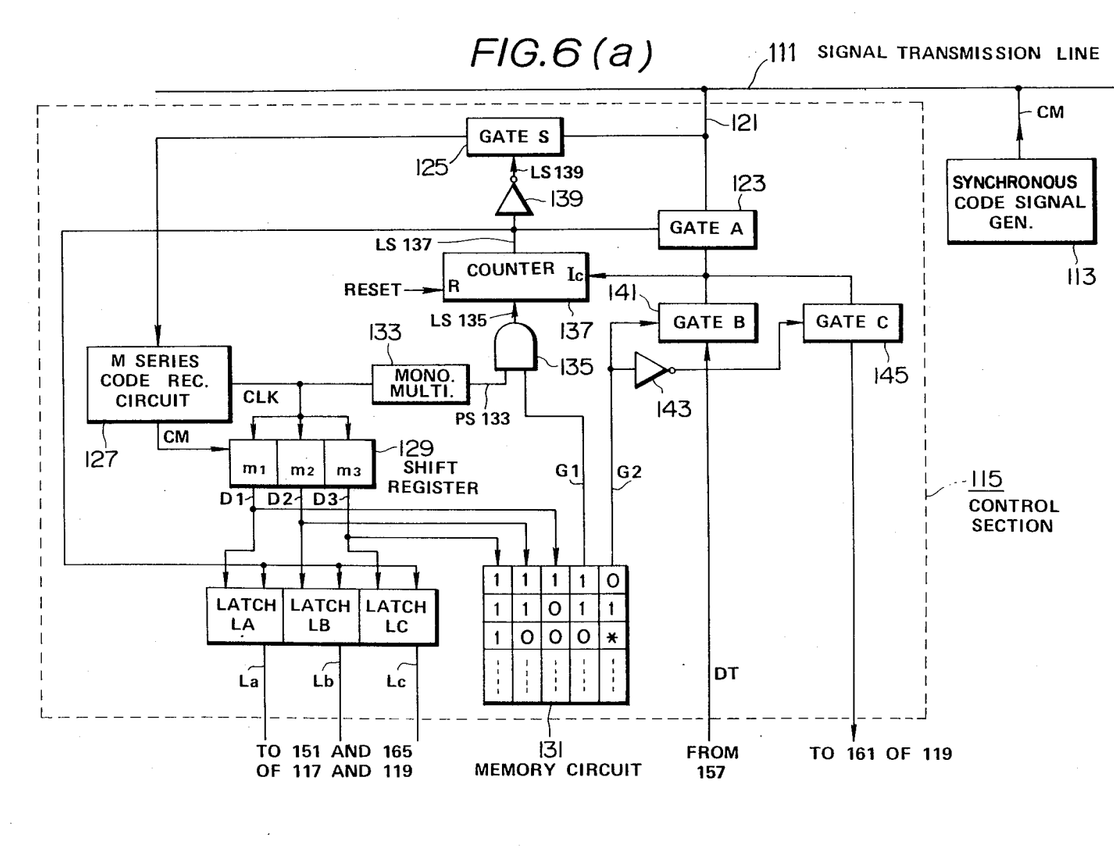
FIGS. 6(a) and 6(b) are, taken together, a circuit block diagram of one of a plurality of communications stations and synchronous code signal generator constituting a preferred embodiment of the present invention.
Figure 6B:
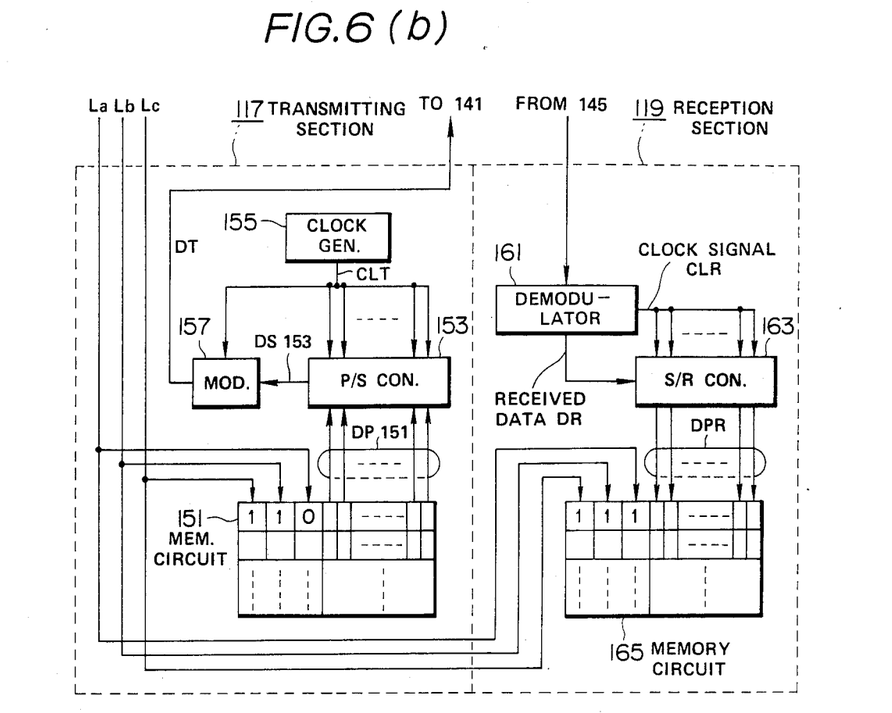

FIGS. 6(a) and 6(b), taken together, show integrally a detailed circuit block diagram of the network system in a preferred embodiment according to the present invention.

In FIGS. 6(a) and 6(b), one of a plurality of stations is connected to a single signal transmission line 111, a single-wire type common signal transmission line, so as to constitute a network system with other communications stations each of which has the same construction as that shown in FIGS. 6(a) and 6(b).

A synchronous code signal generator 113 is connected to the single-wired signal transmission line 111 for receiving and transmitting a serial data string mutually between the plurality of communications stations.

The synchronous code signal generator 113 serves to synchronize the data transmission and reception carried out between each one and between any others of the plurality of stations, to perform an addressing for the related stations, which are mutually communicated and is connected to the signal transmission line 111 separately from the plurality of the stations.

Figure 7:
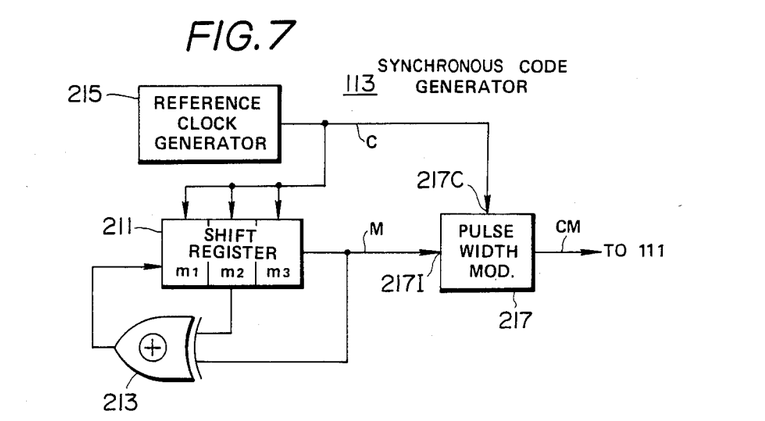
FIG. 7 is a specific circuit block diagram of the synchronous code signal generator shown in FIG. 6(a)

FIG. 7 shows a construction of the synchronous code signal generator 113 in which an M-series code string (in the embodiment third order M series code) is generated as a code string having a constant period.

Figure 8:
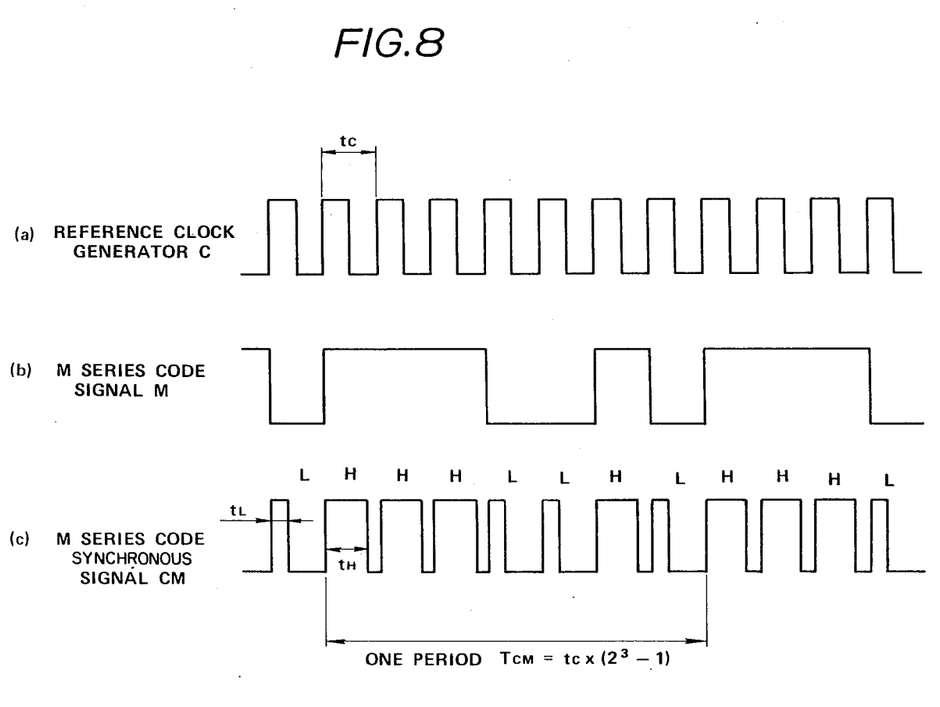
FIG. 8 is a signal waveform timing chart for explaining an operation of the network system shown in FIGS. 6(a) and 6(b)

FIG. 8 shows a signal waveform chart for indicating a signal timing chart in each part of the synchronous code signal generator 113 shown in FIG. 7.

In FIGS. 7 and 8, output signals of the second and third stages m2, m3 of a three-stage shift register (m1 through m3) 211 are sent to an input portion of an Exclusive-OR gate circuit 213 and an output signal of the Exclusive-OR gate circuit 213 is input to an input portion of a first stage of the shift register 211. The shift operations of the shift register 211 is controlled by means of a reference clock signal C sent from a reference clock generator 215.

The M-series code string generated by the combination of the shift register 211 and Exclusive-OR gate circuit 213 is a third order M-series code string which conforms to a polynominal expression (m3⊕m2) derived from the logical exclusive-OR of the output signals of the third and second stages of the shift register 211.

The third-order M series code signal M (refer to (b) in FIG. 8) derived from the output portion of the third stage m3 of the shift register 211 is sent to a pulsewidth modulator 217 at a signal input terminal 217I thereof. Furthermore, a control terminal 217C of the pulsewidth modulator 217 receives a reference clock signal from a reference clock signal generator 215.

The pulsewidth modulator 217 in synchronization with each rising edge of the reference clock signal C (refer to (a) of FIG. 8) having the constant period tc outputs a pulse signal such that a pulsewidth is different according to a logic state of the M series code signal M. That is to say, when the M series code signal M is at a low logic state ("L"), the pulse signal having a narrow pulsewidth (retention time $t_L$) is generated and when the M series code signal M is at a high logic state ("H"), the pulse signal having a wide pulsewidth (retention time $t_H$) is generated. In this way, the M series code synchronous signal CM is generated from the pulsewidth modulator 217 as shown in (c) of FIG. 8.

It is well known to use such an M-series code signal as the synchronous signal. In general, a maximum period T of the code series achievable with the n-stage shift register and logic element can be expressed as:

$$T = 2^n - 1 \qquad (1)$$

Therefore, the code status in the same combination takes a period T expressed in the above equation (1). During the period T, the code status of the same combination is not generated. In a case when the shift register having a predetermined number of stages utilizes the M series code as the synchronous signal so that the number of channels can most effectively be maximized.

Therefore, the M series code is most commonly used as the synchronous signal of the data communication. In the synchronous code signal generator 113 in this embodiment shown in FIG. 6, the number of n in the shift register 211 is three stages. The period $T_{CM}$ in the M series code synchronous signal CM is expressed as:

$$T_{CM} = t_c \times (2^3 - 1) \qquad (2)$$

The combination status of the code is seven ($=2^3-1$) kinds. The M-series code synchronous signal CM generated from the synchronous code generator 113 is sent to the signal transmission line 111 to which the plurality of stations are commonly connected. Each bit generated cyclically in the M-series code signal generator 113 comprises pulses having a wide pulsewidth $t_H$ or a narrow pulsewidth $t_L$, representing either "1" or "0" in each bit pulse. It should be noted that pulsewidths $t_H$ and $t_L$ in each bit of the M-series code synchronous signal CM are extremely larger than those in each bit of the serial data string transmitted and received between each of the stations in the network system in this embodiment. Therefore, if both M-series code synchronous signal CM and serial data string are commonly transmitted on the signal transmission line 111, the signal can be identified as to whether it is the bit pulse of the synchronous signal or it is the bit pulse of the serial data.

Next, the construction of one of the plurality of stations will be described in details with reference to FIGS. 6(a) and 6(b).

Figure 9:
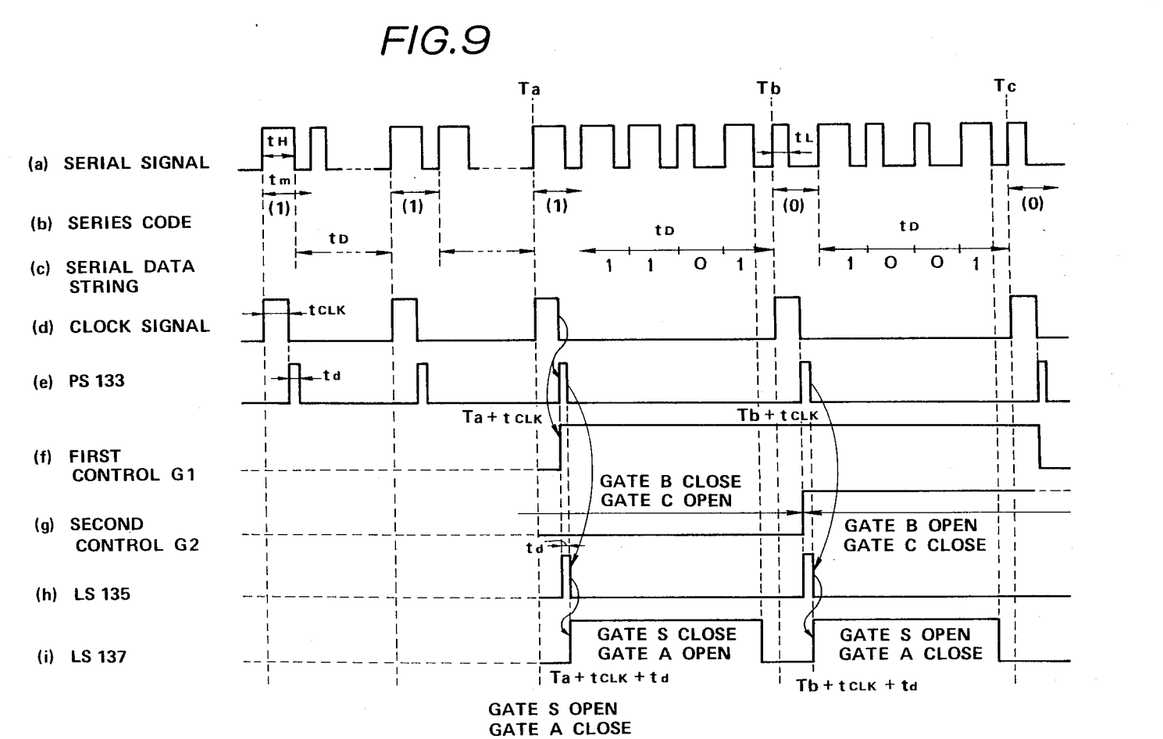
FIG. 9 shows a timing chart of representative signals in the network system in the embodiment shown in FIGS. 6(a) and 6(b).

FIG. 9 shows a timing chart of representative signals in the network system in the embodiment shown in FIGS. 6(a) and 6(b).

The signal transmission line 111 transmits a serial signal (refer to (a) of FIG. 9) including the M-series code signal and serial data. An internal construction of one station includes a control section 115 for carrying out the transmission and reception of the serial data string between the related stations. In addition, the station includes a transmitting section 117 for transmitting the serial data string stored therein from the station in response to a corresponding command from the control section 117. Furthermore, the station includes a reception section 119 for receiving the serial data string from the signal transmission line 111 in response to a corresponding command from the control section 115.

A signal input/output line 121 for connecting the control section 115 to the signal transmission line 111 is connected to a gate A123 which opens when either the transmission or reception of the serial data string in the station is carried out and to a gate S125 which opens when an addressing of the serial data string to be transmitted or received is carried out.

An M-series code reception circuit 127 receives the M-series code synchronous signal CM received from the signal transmission line 111 during a time in which gate S125 is open and outputs the clock signal CLK and M-series code synchronous signal CM as shown in (d) of FIG. 9.

A clock terminal of each stage in the three-stage shift register 129 commonly receives the clock signal CLK. The signal input terminal of the first stage (m1) receives the M series code synchronous signal CM. The first stage m1 of the shift register 129 latches the logic level (corresponding to the contents of the serial data) of the M series code synchronous signal CM in synchronization with the falling edge of the clock signal CLK. Similarly, the second and third stages m2, m3 of the shift register 129 latch the logic status latched in the first and second stages m1, m2 in synchronization with the falling edge of the clock signal CLK. In other words, the level of the synchronous signal CM shifts sequentially and is latched in synchronization with the clock signal CLK. The output signals D1, D2 and D3 each representing the latch status in the corresponding stage of the shift register 129 are generated so that the memory circuit 131 (, e.g., ROM) receives the address data. In addition, the output signals D1, D2, and D3 are sent to three latch circuits LA, LB, and LC comprising D-type flip-flop circuits respectively.

In the memory circuit 131, combination patterns of "H" (high level) and "L" (low level) appearing between one period $T_{CM}$ of the M series code are set as addresses. The data G1, G2 for controlling transmission and reception of the station are stored in each address designated by a combination of patterns of "H" and "L". Each kind of circuits is provided for controlling open and close of the above-described gates A123 and S125. A monostable multivibrator 133 which receives the clock signal CLK outputted from the M series code signal reception circuit 127 generates a pulse signal PS133 (refer to (e) of FIG. 9) having a width td in synchronization with the falling edge of the clock signal CLK. The pulsewidth td is selected so as to satisfy the following inequality td$<$t$_m$$-$t$_{CLK}$, wherein t$_m$ denotes a time interval from the time when each bit pulse forming the M series synchronous signal CM in the serial signal (refer to (a) of FIG. 9) appearing on the signal transmission line 111 to the time when the first bit pulse in the serial data string to be transmitted and received appears.

An AND gate 135 takes a logical AND with the first control data signal G1 outputted from the memory circuit 131 and output pulse signal PS133 from the monostable multivibrator 133 and generates a logic signal LS135 from the result of the logical AND operation. The logic signal LS135 is sent to a count control terminal of a counter 137. The counter 137 starts counting of the pulse number of the pulse signal input at a count number input terminal I$_c$. An output logic signal LS137 of the counter 137 is sent to a gate A123 and inverter 139. In addition, an output logic signal LS137 of the counter 137 is normally set to a "low" level (initial reset). When the counter 137 starts counting, the output logic signal LS137 of the counter 137 is sent to the gate A123 and inverter 139. In addition, the inverted logic signal LS139 of the inverter 139 is sent to the gate S125. Therefore, the gate A123 is opened or closed according to the level ("H" and "L") of the logic signal LS137. The gate S125 is closed or opened according to the level ("L" and "H") of the inverted output logic signal LS139. That is to say, the opening and closing of the gates A123 and S125 are mutually opposite. The second control data signal G2 from the memory circuit 131 is sent to a gate B141 and inverter 143. An inverted output logic signal of the inverter 143 is sent to a gate C145. Hence, the gate B141 is opened or closed according to the logic status ("H" and "L") of the second control data signal G2, and gate C145 is closed or opened according to the logic status ("L" and "H") of the second control data signal G2.

The transmission section 117 of the station is connected to the signal transmission line 111 via the gates A123 and B141 and the signal input/output line 121. On the other hand, the reception section 119 of the station is connected to the signal transmission line 117 via the gates A123 and C145 and signal input/output line 121. The output logic signal LS137 of the counter 137 is commonly sent to each clock terminal of the three latch circuits (D-type flip-flop circuits). These latch output signals $L_a$, $L_b$ and $L_c$ are generated as address signals for transmission and reception of data.

The transmission section 117 comprises a memory circuit 151 (, e.g., back-uped RAM) storing data constituted by a plurality of bits; a parallel-to-serial converter for converting a parallel data DP151 output from the memory circuit 151 into a serial data DS153 (hereinafter referred to as P/S converter); a clock generator 155 for providing the clock signal CLT (clock signal for transmitting the serial data) having a predetermined period $T_{CLT}$ for the P/S converter 153; and a modulator 157 for outputting the serial data string signal DT derived from the pulsewidth modulation of the clock signal CLT from the clock generator 155 in accordance with "H" and "L" ("H" corresponds to "1" and "L" corresponds to "0"). The period $T_{CLT}$ of the clock signal CLT defines that of transmission of the serial data and is extremely shorter than that (a period $t_c$ of the reference clock signal C defining an interval for which the serial data is transmitted and received) of each bit forming the M series code synchronous signal CM. The latch output signals La through Lc of the output portions D1 through D3 of the shift register 129 are sent to the memory circuit 151 as address data, the data stored in the input address being outputted.

The reception section 119 comprises: a demodulator 161 which demodulates the received data fetched via the gate C145 to separate into the clock signal CLR and serial data signal DR; a Serial-to-Parallel converter (hereinafter referred to as S/P converter) which converts the demodulated serial data signal DR into a parallel data signal DPR; and a memory circuit 165 (e.g., RAM) for storing the parallel data signal DPR output from the S/P converter 163. It should be noted that the period $T_{CLR}$ of the demodulated clock signal CLR is the same as the period $T_{CLT}$ of the clock signal CLT in the transmission section 117.

The memory circuit 165 receives the output signals La, Lb, and Lc of the three latch circuits LA, LB and LC as the address data and writes data supplied from the S/P converter 163 into the specified address.

The respective memory circuits 151, 165 within the transmission section 117 and reception section 119 are, for example, connected to a microcomputer (not shown). The transmission data are written into the memory circuit 151 according to the state of a controlled load, and the controlled load is controlled on the basis of data read in the memory circuit 165. It should be noted that the counter 137 provided within the control section 115 of the station shown in FIG. 6(a) initially resets reception circuit 127. Any one of the addresses specified in accordance with output signal level patterns D1, D2, and D3 of the shift register 129 generates, the first control data signal G1 and second control data signal G2 stored in the memory circuit 131.

The AND gate 135 takes a logical product between a pulse signal PS133 derived from a monostable multivibrator 133 and first control data signal G1 from the memory circuit 131. The output logical signal LS135 is sent to the counter 137. Hence, when the first control data signal G1 is at a "H(high)" level status, the output logic signal LS137 is turned to a "H(high)" level in response to a falling edge of the pulse signal PS133. Thus, the gate S125 is closed and the gate A123 is opened. When the gate A123 is opened, either the transmission section 117 or reception section 119 is connected to the signal transmission line 111. Either of the two sections 117 or 119 is connected to the line 111 depending on a logic status of a second control data signal G2 derived from the memory circuit 131. A reset signal from, e.g., the microcomputer is sent to the counter 137 at its reset terminal R so that the output logic signal LS137 is initially at the low ("L") logic status. Therefore, the gate S125 is at this time open and the signal transmission line 111 is connected to the M series code reception circuit 127. In this case, the serial signal shown in (a) of FIG. 9 is introduced into the M series code reception circuit 127 via the gate S125 from the signal transmission line 111.

It is not certain whether the first introduced signal pulse is a bit pulse having the wider pulsewidths $t_H$ and $t_L$ forming the synchronous signal CM or a bit pulse having the extremely narrower pulsewidths forming the serial data. The M series code reception circuit 127 is so constructed as to respond only to a pulse having a pulsewidth wider than a constant width (for example, a pulsewidth $t_L$ narrower than a bit forming the synchronous signal CM) at the initial stage of operation in the station. Each bit pulse in a serial data string and in the synchronous signal CM are identified so that the first bit pulse is captured which forms the synchronous signal CM. Thereafter, the M-series code signal reception circuit 127 demodulates the clock signal CLK and synchronous signal CM as described above.

Hence, the M-series code synchronous signal CM output from the synchronous signal generator 113 can be stored in the shift register 129 under the operation of the above-described M series code signal transmission line 111 is connected to either the transmission section 117 or reception section 119. Which of these sections 117, 119 is connected to the signal transmission line 111 depends on the logic status of the second control data signal G2. In this way, either of the following operations is carried out: the transmission mode of the station is enabled or the reception mode of the station is enabled.

Suppose that in the above-described construction of one station constituting the network system the memory circuit 131 stores data as shown in FIG. 6(a) and memory areas in the other memory circuits 151, 165 are provided correspondingly to the respective addresses shown in FIG. 6(b). Suppose also that the sequential bit status in the M series code string is (1, 1, 1, 0, 0, . . .) as shown in (b) of FIG. 9 and the M series code synchronous signal CM is generated from the synchronous code generator 113. The M series code at a defined time Ta is (1, 1, 1), at a time Tb is (1, 1, 0), and at a time tc is (1, 0, 0).

An internal [Ta, Tb] is a reception interval on the station and interval [Tb, Tc] is a transmission interval.

In the reception interval [Ta, Tb] the shift register 129 in the control section 115 stores the logic status of (1, 1, 1) so that the first control data signal G1 from the memory circuit 131 is selected as "1" and second control data signal G2 is selected as "0". It should be noted that since there is a delay in time, the first control data signal G1 is turned to a "1" at a time (Ta+$t_{CLK}$) delayed by the pulsewidth $t_{CLK}$ of the clock pulse CLK from the time Ta. Although the output logic signal LS135 of the AND gate 135 is at a "H(high)" logic status in response to the change of the first control data signal G1 to the high level ("1") state, the output logic signal LS135 of the AND gate 135 is turned to the "high(H)" logic status at the time $(Ta+t_{CLK}+t_d)$ in response to the fall of the output pulse signal PS133 from the monostable multivibrator 133. In addition, the output logic signal LS137 of the counter 137 is at the "high(H)" level logic status. Therefore, the gate S125 is closed and gate A123 is opened. At this time the output logic signal LS137 of the counter 137 is commonly sent to the three latch circuits LA, LB, and LC. Hence, the logic status (1, 1, 1) of the output signals D1, D2, and D3 in the shift register 129 is latched. The latched signals La, Lb, and Lc are sent in parallel to the memory circuits 151, 165 of the transmission and reception sections 117 and 119 as each address data.

Since in the stored state in the memory circuit 131 of the control section 115 the data is stored so that the station is in the reception mode in the case of address (1, 1, 1), the second control data signal G2 is "0", i.e., at the "L(low)" logic status. Hence, the gate B141 is closed and the gate C145 is opened. In this way, since both gates A123 and C145 are opened, the signal transmission line 111 is connected to the reception section 119 via the series circuit formed by the gates A123 and C145 so that the station is enabled to receive the serial data. Therefore, the data (1, 1, 0, 1) whose length is within the reception interval [Ta, Tb] among the serial data string shown in (c) of FIG. 9 is introduced sequentially in the reception section 119. The demodulator 161 demodulates the serial data modulated in the pulsewidth modulation into the received data DR in the logic status of "1101" for each bit. Thereafter, the received data DR is converted into the parallel data DPR by means of the S/P converter 163. At this time, the memory circuit 165 receives (1, 1, 1) as address data so that the received data from the signal transmission line 111 is stored in a memory area corresponding to the address (1, 1, 1). In this embodiment, the serial data in a single unit within one interval (time slot) in the serial signal to be transmitted and received comprises four bits. The time of the serial data string in the single unit is denoted by $t_D$. The serial data string fetched via the gate A123 is introduced to the count input terminal $I_c$ of the counter 137. After the counting is enabled at the time $(Ta+t_{CLK}+t_d)$, the counter 137 starts counting whenever the rising edge of each bit pulse in the serial data string appears. When the counter counts four bits of the single unit, the output logic signal LS137 of the counter 137 is at the "(L)low" logic state. The reception mode of data is ended with the gate A123 closed. At the same time, since the gate S125 is opened, the reception circuit 127 can receive the subsequent M series code synchronous signal CM.

Next, the operation at the transmission interval [Tb, Tc] will be described in the following. Suppose that upon the completion of the received operation, the operation at the interval [Tb, Tc] is carried out. After the time Tb, the output signals D3, D2, and D1 of the shift register 129 in response to the first clock pulse of the clock signal CLK are (1, 1, 0) if the first bit status in the M series code is "0" (refer to (a) of FIG. 9). Since the storage data in the address (1, 1, 0) of the memory circuit 131 is specified, both first and second control data signals are turned to "1"s. The second control data signal G2 is turned to the "H(high)" logic status at the time $(Tb+t_{CLK})$ due to the time delay. It should be noted that the first control data signal G1 remains at the "H(high)" logic state since the level does not change. In the same way as the case of reception interval, the counter 137 is enabled to start counting at the time $(Tb+t_{CLK}+t_d)$ when the output logic signal LS135 of the AND gate 135 falls and the output logic signal LS137 is held at the "H(high)" logic state. Hence, since the gate A123 is opened and the gate S125 is closed, the M series code reception circuit 127 does not introduce the synchronous signal CM.

On the other hand, since the second control data signal G2 from the memory circuit 131 is at the "H(high)" logic status after the time $(Tb+t_{CLK}+t_d)$, the gate B141 is opened and gate C145 is closed. Hence, the transmission line 111 is connected to the series circuit of both gates A123 and gate B141 so that the transmission mode is formed. In this case, the gate C145 is closed so that the reception section 119 is disconnected from the signal transmission line 111. Thus, the station is only in the transmission mode.

Since the output logic signal LS137 of the counter 137 is commonly sent to the three latch circuits LA, LB, and LC, the logic state of the latched output signals La, Lb, and Lc is turned to (1, 1, 0) to carry out addressing of the memory circuit 151 of the transmission section 117. Hence, until the expiration of one period of the synchronous signal CM from the time Tb, the serial data of the plurality of bits is transmitted to the data transmission line 111 via the gates A123, B141. At this time, the transmission data in a memory area corresponding to the address data (1, 1, 0) is sent from the memory circuit 151. Suppose that data stored in an address (1, 1, 0) in the memory circuit 151 of the transmission section 117 is a parallel data represented as (1, 0, 0, 1). As described above, the data (1, 0, 0, 1) is read from the memory circuit 151 when the address (1, 1, 0) is specified. Therefore, the parallel data signal DP151 is sent in parallel to the P/S converter 153. The P/S converter 153 converts the parallel data signal DP151 into the serial form DS153 in synchronization with the clock signal CLT. The serial data signal DS153 after conversion is modulated in the pulswidth modulation by means of the modulator 157 in response to the clock signal CLT. The data signal DT (refer to (a) of FIG. 9) of the serial data (1, 0, 0, 1) in which the wide pulse representing the logic status of "1" and narrow pulse representing the logic status of "0" are present serial with respect to time is outputted to the signal transmission line 111 via the gates D141 and A123.

As described above, the reception of the serial data is carried out in the station shown in FIGS. 6(a) and 6(b) when the received address data is (1, 1, 1) and the transmission of the serial data is carried out in the station shown in FIGS. 6(a) and 6(b) when the received address data is (1, 1, 0). Accordingly, when the address is (1, 1, 1), in one of the other stations each memory circuit 131, 151, 165 is set to carry out transmission of the serial data and when the address is (1, 1, 0), in the other one each memory circuit 131, 151, 165 is set to carry out reception of the serial data so that the synchronization is established between the station shown in FIGS. 6(a) and 6(b) and the other one and mutual communications with the serial data are established.

In this way, the station shown in FIGS. 6(a) and 6(b) can transmit and receive the predetermined data to and from the two stations among the other stations without collision of the data.

Hence, if another station sets the transmission and reception of data for the address common to one station to and from which the predetermined data is mutually transmitted and received, the addressing is possible with the synchronization of the synchronous signal CM.

Furthermore, it is possible for the one station to communicate with the other plurality of stations with the plurality of data. If any one of the stations is set as a station which can only transmit or receive the data, the station may eliminate either the transmission section 117 or reception section 119 shown in FIGS. 6(a) and 6(b).

In this way, the single common signal transmission line can transmit the synchronous code together with the serial data string. Since the M series periodic code is used, checking the sequence of the synchronous code is possible with the polynominal expression. Although the length in time of one period becomes long since the synchronous code and serial data are transferred serially, an efficient transmission can be achieved if the length of one bit in the synchronous code string is shorter.

It should be noted that although the M series code is used as the synchronous code in this embodiment, there are other series code such as L series etc. However, the generation polynominal expression becomes complex as compared with the M series code.

In addition, although the modulation mode of the synchronous code is carried out in the pulsewidth modulation, it is also possible to use a frequency modulation or amplitude modulation.

In the frequency modulation mode, a frequency F1 is, for example, generated when the code is "0" and a frequency F2 is generated when the code is "0". A filter is used to perform a frequency discrimination to distinguish both data "1" an "0". The counter 137 shown in FIG. 6(a) is not needed if the serial data and frequency range in the frequency modulation are mutually set at different values. That is to say, the gate S125 shown in FIG. 1 is opened upon the detection of the arrival of the synchronous code by means of the filter. After the discrimination of the code, the gate S125 is closed and the gate A123 is opened so as to perform the transmission and reception of the serial data.

In the amplitude modulation, the voltage level of the synchronous code is $V_1$, e.g., for the code at a "1", $V_0$ for the code at a "0" and $V_D$ ($V_1 \neq V_0 \neq V_D$) for the serial data. In this case, a comparator is provided at a reception side, the frequency F1 in the frequency modulation type is replaced with $V_1$, the frequency F0 is replaced with $V_0$. Therefore, the same transmission and reception as the frequency modulation type is possible.

In addition, in a system wherein the voltage of the synchronous code is set as Vs ($\neq V_D$), and the pulsewidth $t_H$ when the code is "1" and $t_L$ when the code is "0" or in a system wherein the synchronous code is set as the frequency Fs ($\neq F_D$), voltage $V_1$ for the code "1", voltage $V_0$ for the code "0", it is also possible to transmit and receive the serial data to and from the common signal transmission line.

As described hereinabove, since in the network system according to the present invention the single signal transmission line discriminates the synchronous addressing code received via the signal transmission line and serial data string signal and exchanges address determining means and serial data transmission and reception means, a low-cost network system in simplicity in construction can be achieved.

What is claimed is:

1. A network system, comprising:
   (a) a single-wire common signal transmission line for transferring a serial bit data string between a plurality of data processing stations connected thereto;
   (b) first means for repeatedly generating an address information bit signal based on a predetermined time series code for each predetermined synchronization timing, modulating each address information bit signal into a synchronous signal having predetermined pulsewidths which are dependent on bit status information of each address information bit signal and outputting the modulated synchronous signal to the common signal transmission line so as to be superposed on the serial bit data string;
   (c) second means provided within each station for receiving the synchronous signal on the signal transmission line derived from said first means and extracting the bit status information of the predetermined time series code from the received synchronous signal on the basis of the pulsewidth of the received synchronous signal from the common signal transmission line;
   (d) third means for determining a bit combination pattern of a predetermined bit length inherent in the predetermined time series code from the predetermined time series code comprising the bit status information extracted by said second means; and
   (e) fourth means for determining an operation mode of the station from the bit combination pattern determined by said third means.

2. The network system according to claim 1, wherein said fourth means determines transmission or reception of the serial data bit string from or to the station to or from any other station via the signal transmission line based on a predetermined bit combination pattern of the predetermined bit length allocated to the station.

3. The network system according to claim 1, wherein the operation mode of the station includes one of a serial data bit string transmission mode, a serial data bit string reception mode, and a serial data bit string transmission/reception disabled mode.

4. The network system according to claim 3, which further comprises fifth means for transmitting a plurality of bit data stored therein in a bit serial manner within each predetermined synchronization timing when said fourth means determines the transmission mode to another station in which said fourth means determines the reception mode, an address for storing the plurality of bit data being specified by one of the bit combination patterns on the basis of which said fourth means determines the transmission mode.

5. The network system according to claim 4, which further comprises sixth means for receiving a plurality of bit data in a bit serial manner within each predetermining synchronization timing when said fourth means determines the reception mode from the other station in which said fourth means determines the transmission mode, an address for storing the transmitted bit data being specified by one of the bit combination patterns on the basis of which said fourth means determines the reception mode.

6. The network system according to claim 1, wherein said first means comprises: an M-series code generating means generating an M-series code in synchronization with a reference clock signal generated therewithin and having a constant period at each synchronization timing; and a pulsewidth modulator modulating said M-series code for generating the synchronous signal at each synchronization timing.

7. The network system according to claim 6, wherein said second means comprises a gate which is opened only when each bit status information constituting the M-series code on the signal transmission line is received.

8. The network system according to claim 1, wherein each predetermined pulsewidth of the synchronous signal generated and output by said first means has a predetermined relationship with each pulsewidth of the serial bit data string.

9. A network system comprising:
  (a) a single-wire common signal transmission line for transferring a serial bit data string between a plurality of data stations connected thereto;
  (b) first means for repeatedly generating an address information bit signal based on a predetermined time series code for each predetermined synchronization timing, modulating each address information bit signal into a synchronous signal having predetermined voltage levels which are dependent on a bit status information of each address information bit signal and outputting the modulated synchronous signal to the common signal transmission line so as to be superposed on the serial bit data string;
  (c) second means provided within each station for receiving the synchronous signal on the signal transmission line derived from said first means and extracting the bit status information of the predetermined time series code from the received synchronous signal according to the predetermined voltage levels:
  (d) third means for determining a bit combination pattern of a predetermined bit length inherent in the predetermined time series code from the predetermined series code comprising the bit status information extracted by said second means; and
  (e) fourth means for determining an operation mode of the station dependent on the bit combination pattern determined by said third means.

* * * * *